Figure 1:
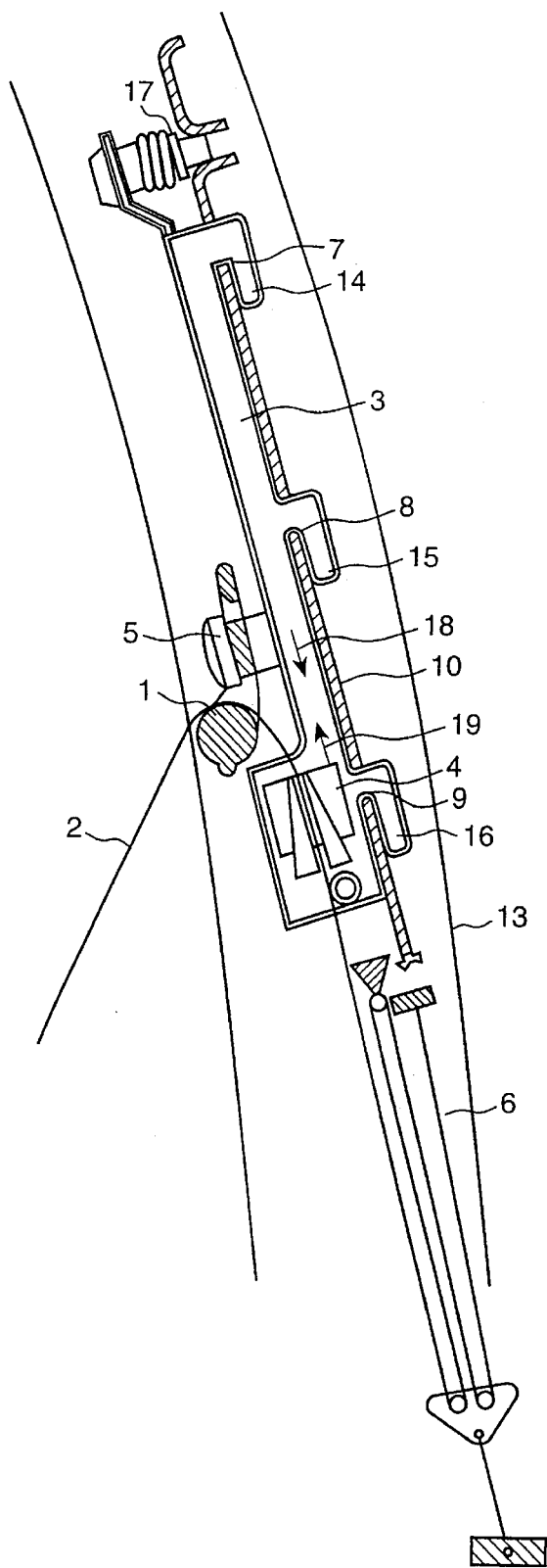

United States Patent [19]

Schmidt

[11] Patent Number: 5,547,222
[45] Date of Patent: Aug. 20, 1996

[54] SAFETY BELT SYSTEM FOR A VEHICLE

[75] Inventor: Reinhard Schmidt, Lennestadt-Grevenbreück, Germany

[73] Assignee: R. Schmidt GmbH, Lennestadt-Grevenbrück, Germany

[21] Appl. No.: 377,748

[22] Filed: Jan. 24, 1995

[30] Foreign Application Priority Data

Jan. 28, 1994 [DE] Germany .......................... 44 02 593.9

[51] Int. Cl.$^6$ ............................ B60R 22/47; B60R 22/18; B60R 22/36
[52] U.S. Cl. ........................................ 280/801.2; 280/806
[58] Field of Search ................................. 280/801.2, 806

[56] References Cited

U.S. PATENT DOCUMENTS

| | | | |
|---|---|---|---|
| 4,552,407 | 11/1985 | Takada | 280/806 |
| 4,682,791 | 7/1987 | Ernst | 280/806 |
| 4,756,554 | 7/1988 | Tibbe | 280/806 |
| 5,295,714 | 3/1994 | Föhl | 280/806 |

*Primary Examiner*—Kenneth R. Rice
*Attorney, Agent, or Firm*—Keck, Mahin & Cate

[57] ABSTRACT

A safety belt system for a motor vehicle includes a safety belt that is stored in a belt storage unit, a belt reversing point, a carrier that is fastened on a part of the motor vehicle body, an adjusting part that carries the belt reversing point and is arranged on the carrier such that it may be displaced and locked in different positions, and a clamping device. The clamping device is fastened onto the carrier in such a way that forces that originate from the safety belt while the safety belt is clamped in the clamping device and act at the fastening point of the clamping device and the locking position of the adjusting part are directed opposite to one another.

6 Claims, 4 Drawing Sheets

SAFETY BELT SYSTEM FOR A VEHICLE

DESCRIPTION

The invention pertains to a safety belt system.

Customary safety belt systems, in particular three-point safety belt systems, comprise a belt storage unit, e.g., in the form of the winding shaft of an automatic belt wind-up device. Originating from the winding shaft of the automatic belt wind-up device, the safety belt extends over a belt reversing point which, in a three-point safety belt system, forms a shoulder coupling point that may be adjusted in its elevation. The drawn out safety belt which originates from the belt reversing point is placed around the body of the passenger.

In practical applications, it cannot be avoided that the parts of the safety belt which are situated in the safety belt storage unit, e.g., the layers of the safety belt that are wound onto the winding shaft, have a certain slack due to the film spool effect. Despite the fact that the winding shaft is blocked during an accident, this slack leads to a relatively large forward displacement of the body of the passenger. In order to prevent such a large forward displacement, it is known to clamp the safety belt by means of a clamping device. The forces that are applied onto the clamped safety belt are absorbed by the clamping device and introduced from said clamping device into the motor vehicle body, e.g., into a body post of the motor vehicle. The point at which the clamping device and the part of the motor vehicle body are connected and into which the aforementioned forces are introduced must be able to withstand these high forces, i.e., it has to be constructed correspondingly strong.

The invention is based on the objective of creating a safety belt system in which the forces that are introduced into the part of the motor vehicle body are low with regard to the forces transmitted by the safety belt.

According to the invention, this objective is attained with the following characteristics.

The adjusting part and the point at which the clamping device is fastened onto the carrier are arranged relative to one another in such a way that the forces that act on the safety belt which is clamped by means of the actuated clamping device, e.g., due to a forward displacement of the body of the passenger, manifest themselves on the carrier in such a way that they are directed opposite to one another. Consequently, the forces that are introduced by the carrier into the part of the motor vehicle body, e.g., the body post, are reduced correspondingly. The carrier in particular is constructed as an oblong carrier part in the form of a guide rail. The adjusting part with the belt reversing point is arranged on this carrier which essentially extends in the vertical direction along the body post of the motor vehicle such that it may be adjusted in its elevation and locked in certain positions. This measure makes it possible to realize a coupling point for the safety belt within the shoulder region of the passenger that is adapted to the size of the respective passenger.

In a belt reversing point that is designed in this fashion, the point at which the clamping device is fastened onto the carrier preferably is arranged underneath the different positions in which the adjusting part may be locked on the carrier. In such an arrangement, the safety belt storage unit which, for example, may be constructed in the form of the winding shaft of an automatic belt wind-up device is situated underneath the clamping device, so that the safety belt extends from the belt storage unit to the belt reversing point via the clamping device.

The belt storage unit, in particular a belt storage unit in the form of an automatic belt wind-up device, and the clamping device may have a common frame (German Patent No. 4,014,566 A1), with the common frame being fastened onto the carrier or constructed in one piece with said carrier.

Figure 2:
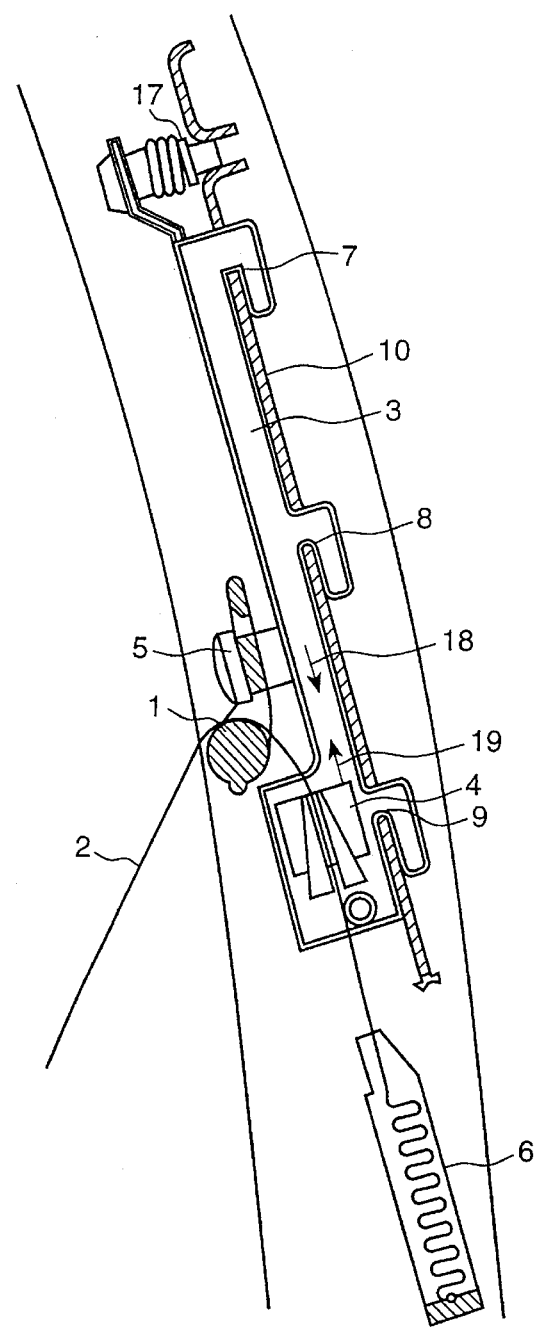
Figure 3:
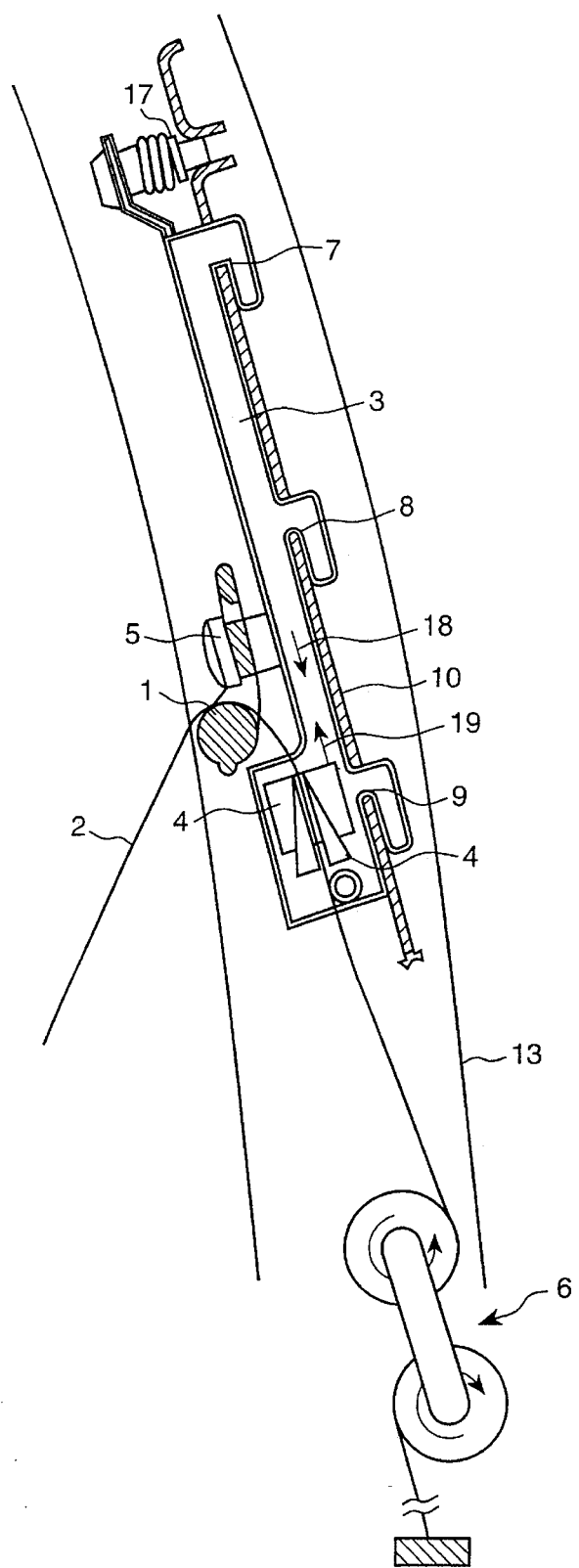
Figure 4C:
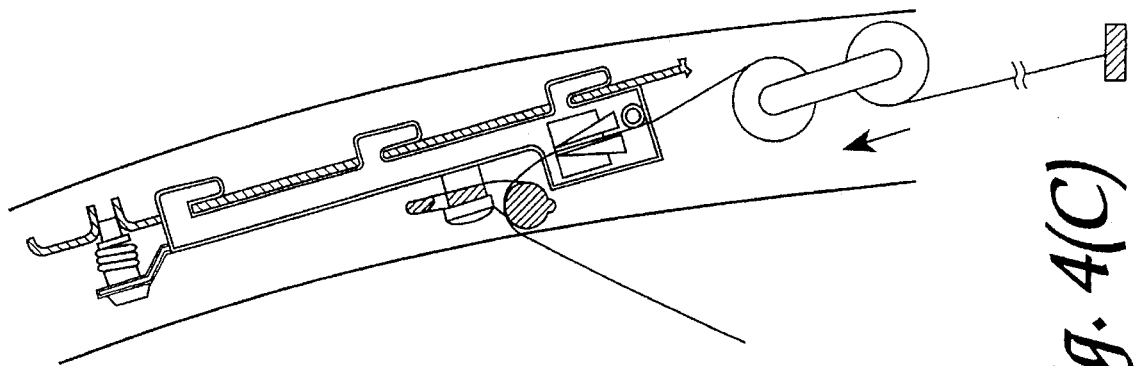
Figure 4B:
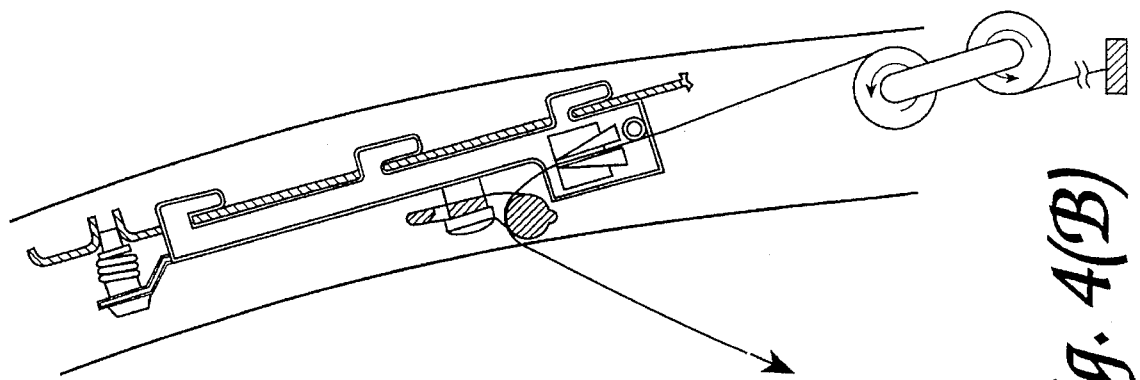
Figure 4A:
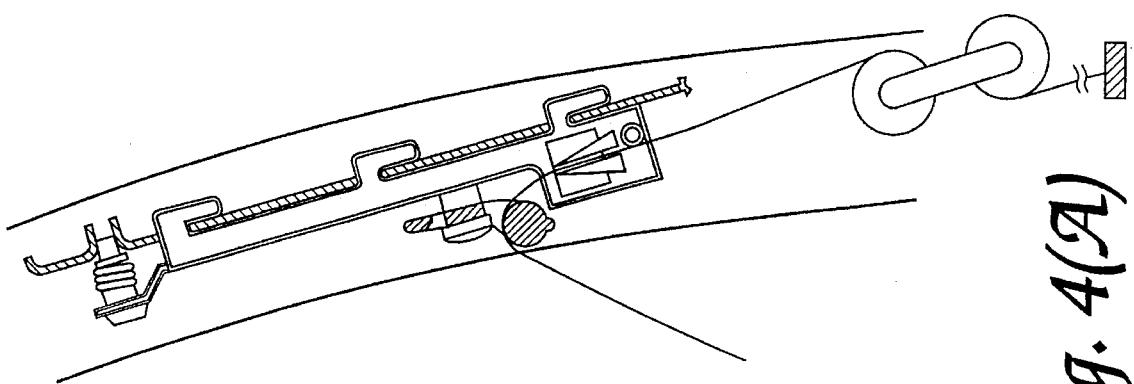

Embodiments of the invention are described in detail below with reference to the figures. The figures show:

FIG. 1: a first embodiment;

FIG. 2: a second embodiment;

FIG. 3: a third embodiment;

FIG. 4 different positions of the embodiment according to (A–C): FIG. 3; and

Figure 5:
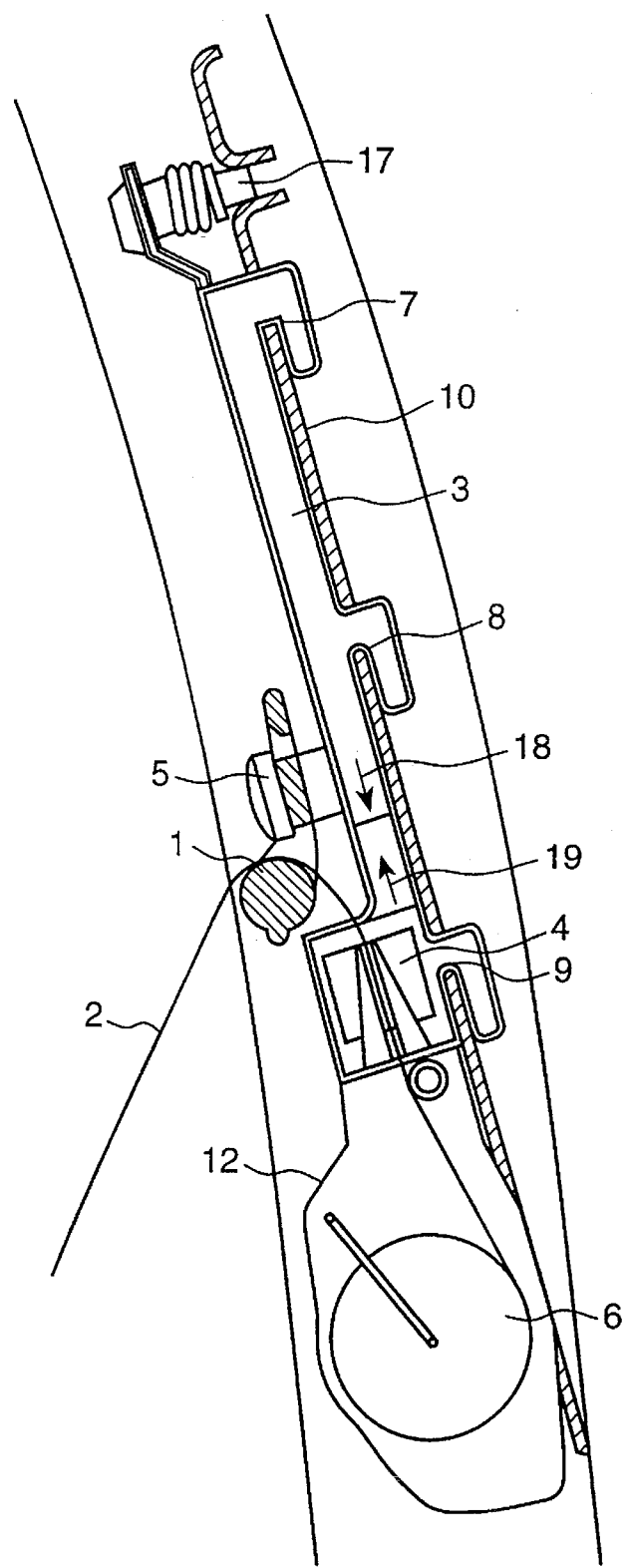

FIG. 5: a fourth embodiment.

FIGS. 1 through 5 show the parts, a belt reversing point 1, a clamping device 4 and a belt storage unit 6, of the different embodiments of the illustrated safety belt system which in particular is designed as a three-point safety belt system. These components of the safety belt system may be arranged within the region of a body post 13 of the motor vehicle.

In the nonoperating condition, a relatively long safety belt 2 of the system is stored in the belt storage unit 6. Originating from said belt storage unit 6, the safety belt 2 extends through a clamping device 4. The clamping device 4 may be constructed in customary fashion. The safety belt 2 extends from the clamping device 4 to the belt reversing point 1. This belt reversing point may be designed as a customary belt reversing mounting. The belt reversing point 1 is fastened onto an adjusting part 5.

The adjusting part 5 is arranged on a carrier 3 which may be designed as a guide rail such that the adjusting part may be displaced and locked in different positions (locking positions). The clamping device 4 additionally is fastened onto the carrier 3. The clamping device 4 and the reversing point 1 are spaced a certain distance apart. The safety belt 2 extends between the clamping device 4 and the belt reversing point 1 in such a way that forces that are introduced into the belt reversing point 1 via the belt 2 and forces that are introduced into the clamping device 4 if said clamping device 4 is actuated, i.e., if the belt is clamped, are directed in essentially opposite directions. Since the clamping device 4 and the adjusting part 5 that carries the belt reversing point 1 are fastened onto a common carrier 3, these forces are introduced into the carrier 3 and essentially neutralize one another. The remaining, uncompensated force component is absorbed by the part 10 of the motor vehicle body, e.g., a part of the body part 13.

Fastening points at three elevations 7, 8, 9 are provided for arranging the carrier 3 on the part 10 of the motor vehicle body. Two fastening means, e.g., hooks 14, 15, 16, may be provided at each elevation. The force components which were not neutralized by the compensation are introduced into the part 10 of the motor vehicle body by the pair of fastening means provided at each respective elevation 7, 8 and 9.

In the embodiments shown, a spring-loaded fastening bolt 17 that engages into the part 10 of the motor vehicle body additionally is provided at the upper end of the carrier 3.

In the embodiments shown, the forces which occur during an accident while the clamping device is actuated are absorbed by the carrier 3 and do not affect the belt storage unit 6. The forces that act at the respective locking positions of the adjusting part 5 and at the point at which the clamping device 4 is fastened onto the carrier are directed opposite one another as schematically indicated by the arrows 18 and 19. The compensation of forces resulting takes place in the carrier 3.

Safety belt-sensitive and motor vehicle-sensitive means that act separately may be utilized in customary fashion for activating the clamping device 4. One obtains a compact arrangement of the clamping device and the belt reversing point by realizing the components in the form of a modular unit, e.g., in the paneling of a body post.

Different belt storage units 6 are used in the different embodiments. In the embodiment according to FIG. 1, the belt storage unit 6 is constructed as a pulley block storage unit in which three reversing points are provided. In the embodiment according to FIG. 2, the safety belt is arranged in a storage shaft, in particular in a meander-shaped fashion. In the embodiment according to FIGS. 3 and 4, the belt storage unit 6 is constructed as a double winding shaft. FIG. 4 (A) represents the non-operated position in which the safety belt is not fastened. FIG. 4 (B) represents the condition while drawing out the safety belt during the fastening process, and FIG. 4 (C) represents the operating position of the fastened safety belt.

In FIG. 5, the belt storage unit 6 is constructed as the winding shaft of an automatic safety belt wind-up device. The automatic wind-up device and the clamping device 4 are arranged on one common frame 12 so that either may be constructed in one piece with the carrier 3 or fastened onto said carrier 3. One example of a combined arrangement of the belt wind-up device and the clamping device on one common frame is disclosed in German Patent No. 4,014,566. German Patent No. 3,330,938 also discloses a combined arrangement consisting of an automatic belt wind-up device and a clamping device in which a pair of clamping elements with gripping surfaces is utilized. These gripping surfaces may be equipped with gripping teeth in customary fashion.

I claim:

1. Safety belt system for a motor vehicle comprising:
   a safety belt,
   a belt storage unit in which said safety belt is stored,
   a belt guide means for reversing the safety belt while fastening said safety belt,
   a carrier that is fastened onto a part of a body of the motor vehicle,
   an adjusting part, on which the belt guide means is mounted, arranged on the carrier such that it is displaceable and lockable in different positions,
   a clamping device for the safety belt which is mounted on the carrier between the belt guide means and the belt storage unit, and
   means for actuating the clamping device upon at least one of an excessive belt draw-out speed and an excessive change in the speed of the motor vehicle,
   the belt guide means and the clamping device being positioned in a fixed relation to each other on the carrier while the clamping device is actuated so that forces caused by belt tension and introduced into the carrier are essentially directed opposite to forces occurring at the belt guide means.

2. Safety belt system according to claim 1, wherein the carrier is constructed in an oblong fashion and essentially extends in the vertical direction, the adjusting part is arranged on the carrier such that its elevation is adjustable, and the point at which the clamping device is fastened onto the carrier is arranged underneath the different positions in which the adjusting part is lockable.

3. Safety belt system according to claim 1, wherein the safety belt extends from the belt storage unit to the belt guide means via the clamping device.

4. Safety belt system according to claim 1, wherein the carrier is fastened onto the body of the motor vehicle at three elevations.

5. Safety belt system according to claim 1, wherein the belt storage unit is constructed as the winding shaft of an automatic wind-up device.

6. Safety belt system according to claim 1, and further comprising one common frame that is fastened onto the carrier, wherein the belt storage unit and the clamping device are seated on said one common frame.

* * * * *